May 24, 1932.  E. A. GREEN  1,860,245
WINDOW
Filed Jan. 28, 1931  2 Sheets-Sheet 1
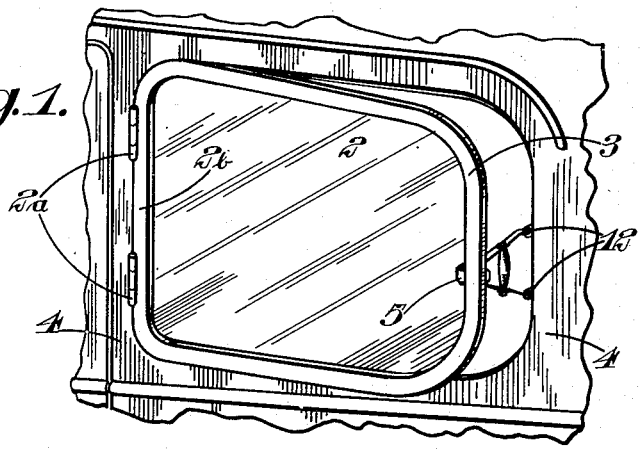
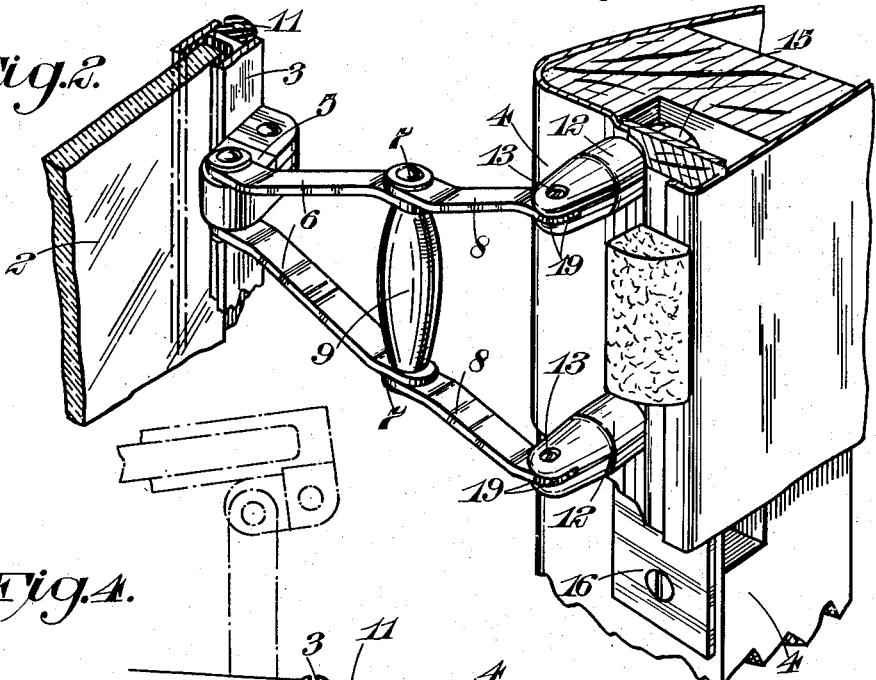
Inventor:
E. A. Green,
By Mawhinney & Mawhinney,
Attys.

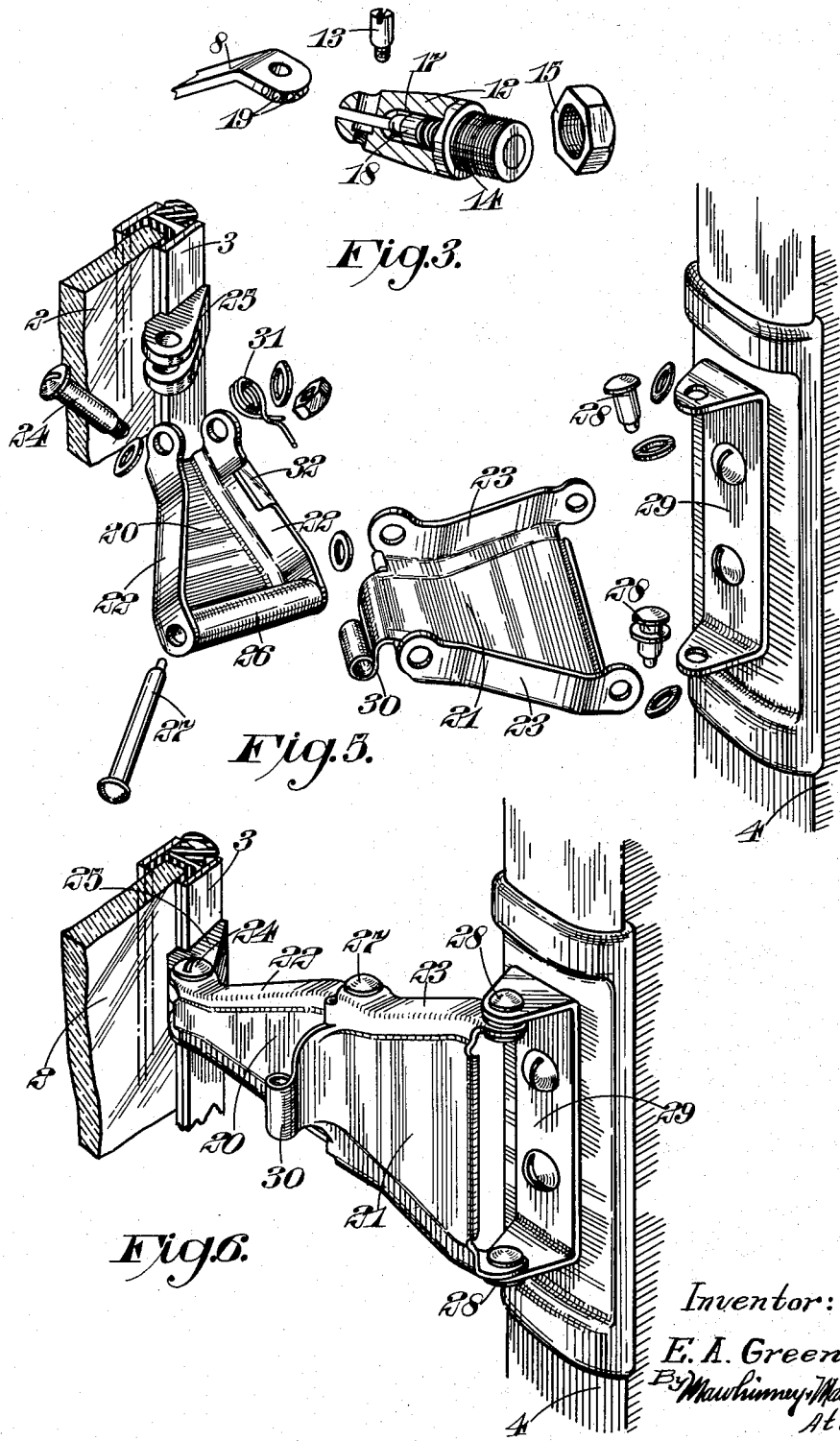

Patented May 24, 1932　　　　　　　　　　　　　　　　　1,860,245

UNITED STATES PATENT OFFICE

EDWARD ARTHUR GREEN, OF COVENTRY, ENGLAND, ASSIGNOR TO HUMBER LIMITED, OF COVENTRY, ENGLAND, A BRITISH COMPANY

WINDOW

Application filed January 28, 1931, Serial No. 511,865, and in Great Britain February 26, 1930.

This invention relates to regulators for adjusting the opening of windows or the like hinged along one edge, such as are used on motor vehicles.

In the case of single-panel windows or the like hinged along one edge, it has been proposed to connect the opposite edge to a fixed supporting frame by means of toggle-links, adapted when extended to hold open the window or the like to any desired extent within the compass of the links and adapted when collapsed to hold it in the closed position automatically.

The invention has for its object to provide an improved form of window regulator of this toggle-linkage type, which will resist movement of the window in a direction parallel to the axis of the hinge and thus prevent strain thereon.

In the accompanying drawings,

Figure 1 is a perspective view of a toggle-linkage according to the invention, fitted to a movable side window of a motor vehicle, and shown in the fully extended position;

Figure 2 is an enlarged perspective view of the toggle-linkage, seen from the interior of the vehicle;

Figure 3 is a perspective view of a pivotal attachment suitable for such a linkage, shown partly sectioned and dismantled.

Figure 4 is a fragmentary sectional view of the collapsed linkage in a direction parallel to the pivotal axes thereof;

Figure 5 is a perspective view of a modified form of linkage, according to the invention, the parts being shown separated from one another; while Figure 6 is a similar view of the modification of Figure 5 with the links in the fully extended position.

In the construction illustrated in Figures 1-4, as applied to a movable window of a motor vehicle body (for instance, in a rear quarter thereof), the window 2 is mounted on hinges 2a along its front vertical edge 2b (Figure 1), and its opposite edge 3 is connected to the body 4 by a toggle-linkage regulator in accordance with this invention.

The rear edge 3 of the window 2 has attached to it an inwardly-projecting lug 5, to either side of which are pivoted the side members 6, 6 of a toggle-link. The central portions of these side members 6, 6 are bent laterally so as to diverge from one another but their ends preferably lie in parallel planes.

The free ends of these side members 6, 6 are pivoted at 7 to similar members 8, 8 also laterally bent and comprising a second toggle-link.

Thus the ends of the members 8, 8 which when extended are furthest from the window 2, are spaced to a considerable extent (see Figure 2), and when the said ends are pivotally attached to the vehicle body 4 adjacent the closed position of the window 2, a substantially triangular linkage is provided having great rigidity in a plane parallel to that of the hinge axis.

The window 2 is therefore well supported at the edge 3 opposite to the hinges 2a which are consequently relieved of part of the weight of the window which would otherwise cause strain and a tendency to rattle. The window 2 is also prevented from vibrating vertically.

The side members 8, 8 attached to the body 4 are preferably somewhat shorter than the other pair 6, 6 and are arranged externally thereto so that the links, when the window 2 is closed, fold neatly within one another and lie substantially in the same plane inside the vehicle (Figure 4).

Preferably the mutually connected ends of the two pairs of coacting side members 6, 8 are spaced by a member 9 which serves to brace the toggle and is shaped to form a grip (see Figure 2), to the extremities of which the toggle-links are pivoted, as at 7.

The arrangement of the toggle-links is such that they tend to return to, and remain in, their collapsed position (Figure 4) in which position any outward force exerted on the window 2 merely causes the side members 6, 8 to move in such a direction that they abut against a rubber or other resilient buffer 10 provided on the edge of the body 4.

For instance, the edge 3 of the window 2 may be provided with a rubber strip 11 to exclude moisture when the window 2 is closed. The side members 6, 8 are arranged to move into a slightly "overset" position (i. e., beyond the "dead-centre") before they abut the buffer stop 10, and consequently the "spring" of the rubber strip 11 tends to force the members 6, 8 against the stop 10 and holds the window 2 in the closed position.

To open the window for ventilation purposes, it is necessary to move the grip 9 in the direction indicated by the arrow (Figure 4) (i. e., towards the hinged edge 2b of the window 2) whereupon the toggle-links are extended and the window 2 is opened to an extent equal to the total length of the links.

Attachment of the linkage to the vehicle body is preferably by means of forked lugs 12 (see Figure 3) in which the side members 8, 8 are pivoted by pins 13. Threaded necks 14 on these lugs 12 may pass through, and be provided with nuts 15 at the back of, a plate 16 screwed to the body 4.

Further, each lug 12 may be axially bored as at 17 and provided internally with a spring-loaded plunger 18 adapted to engage suitable detents 19 in the end of the side member 8 pivoted in the lug 12. By this means the linkage may be held in its extended, or in any intermediate, position.

It will be obvious that the ends of the side members 6, 6 need not necessarily be pivoted close together to a common lug 5.

For instance, they may be widely spaced along the edge of the hinged member provided that the lugs 12 on the stationary member (or vice versa) are spaced even more widely, so that, in accordance with the invention, the two pairs of coacting side members 6, 8 are inclined to one another when the linkage is extended.

By this means, instead of the extended linkage being actually triangular, the two pairs of members 6, 8 together with the coacting edges of the window 2 and body 3 form a trapezoidal figure which has equal rigidity in a direction parallel to the hinge axis.

It will be obvious that, to provide still further rigidity, each pair of side members may be connected by webs. For instance, the side members may be of angle section, instead of flat strips, and they may be bridged by plates secured to them by screws, etc.

In the modification shown in Figures 5 and 6, however, the side members and webs are formed integrally from pressed metal or the equivalent.

Two blanks, originally of substantially triangular shape, provide the webs 20, 21 of the long and short links respectively, while flanges at their non-parallel edges form the side members 22, 22 and 23, 23 thereof.

The side members 22, 22 of the long link are secured by a bolt 24 at one end to a lug 25 on the window frame 3 while, at the other end, the web 20 is curled over to provide a bushing 26 for a long rivet 27 which is connected at its ends to the side members 23, 23 of the short link. The other ends of the side members 23, 23 are pivoted on pegs 28, 28 riveted to the ends of a bracket 29 on the vehicle body 4.

A handle 30 for actuating the linkage is conveniently formed by laterally bending and curling up the web portion 21 of the short link at the end adjacent the rivet 27.

The linkage is biased to its extreme position by a coil spring 31 around the bolt 24, the ends of the spring engaging, respectively, a hole (not shown) in the lug 25 and a tab 32 on one of the side members 22.

The invention obviously may equally well be applied to windscreens of the single-panel type, roof lights etc., and it will be seen that it provides a linkage which is extremely rigid in the plane of the hinge axis.

What I claim as my invention and desire to secure by Letters Patent of the United States is:—

A combined fastener, operator and support for a window hinged at one edge in a supporting frame, comprising a pair of toggle links having side portions converging from end to end of the toggle links to provide a triangular brace structure when the toggle links are open, means for pivotally connecting the narrower end of the toggle link structure to the free edge portion of a window, means for pivotally connecting the wider end of the triangular structure to the inner edge portion of the frame, said toggle links adapted to be folded in closed position for drawing the window into the frame to the desired extent, and yieldable means for holding the toggle links in various positions of adjustment for supporting and holding the window in various open positions.

In testimony whereof I have signed my name to this specification.

EDWARD ARTHUR GREEN.